(12) United States Patent
Huang

(10) Patent No.: US 11,598,455 B2
(45) Date of Patent: Mar. 7, 2023

(54) LEAK-PROOF TUBE FITTING ASSEMBLY STRUCTURE

(71) Applicant: Dongguan Hanxu Hardware Plastic Technology Co., Ltd., Guangdong (CN)

(72) Inventor: Tsung-Hsien Huang, Dongguan (CN)

(73) Assignee: DONGGUAN HANXU HARDWARE PLASTIC TECHNOLOGY CO., LTD., Guangdong (CN)

(*) Notice: Subject to any disclaimer, the term of this patent is extended or adjusted under 35 U.S.C. 154(b) by 42 days.

(21) Appl. No.: 17/326,336

(22) Filed: May 21, 2021

(65) Prior Publication Data

US 2022/0316631 A1  Oct. 6, 2022

(30) Foreign Application Priority Data

Apr. 2, 2021 (CN) .......................... 202110359684.4

(51) Int. Cl.
*F16L 19/04* (2006.01)
*F16L 19/065* (2006.01)
*F16L 33/22* (2006.01)

(52) U.S. Cl.
CPC ........... *F16L 19/043* (2013.01); *F16L 19/065* (2013.01); *F16L 33/223* (2013.01); *F16L 33/225* (2013.01)

(58) Field of Classification Search
CPC ..... F16L 19/043; F16L 19/065; F16L 33/225; F16L 33/22; F16L 33/223
See application file for complete search history.

(56) References Cited

U.S. PATENT DOCUMENTS

| | | | | |
|---|---|---|---|---|
| 3,400,953 A * | 9/1968 | Sullivan | ................ | F16L 19/065 285/354 |
| 3,659,881 A * | 5/1972 | Tinsley | ................ | F16L 19/065 285/331 |
| 3,679,239 A * | 7/1972 | Schmitt | ................ | F16L 19/065 285/341 |
| 4,627,644 A * | 12/1986 | Ekman | .................... | F16L 33/22 285/24 |
| 10,006,570 B2 * | 6/2018 | Yoda | ..................... | F16L 19/065 |
| 10,508,762 B2 * | 12/2019 | Kim | ........................ | F16L 33/22 |
| 2008/0231041 A1 * | 9/2008 | Bucchi | .................... | F16L 33/22 285/32 |
| 2015/0084335 A1 * | 3/2015 | Farrell | .................. | F16L 19/065 285/343 |

(Continued)

FOREIGN PATENT DOCUMENTS

| | | | | |
|---|---|---|---|---|
| DE | 9315600 U1 * | 4/1994 | ............ | F16L 33/223 |
| DE | 29621046 U1 * | 1/1997 | ............ | F16L 33/223 |

(Continued)

*Primary Examiner* — Matthew Troutman
*Assistant Examiner* — Fannie C Kee
(74) *Attorney, Agent, or Firm* — Leong C. Lei

(57) ABSTRACT

A leak-proof tube fitting assembly structure includes a liquid tube, a liquid tube fitting, and a nut for locking and connecting the liquid tube and the liquid tube fitting. The liquid tube fitting has a first connecting end, a first threaded connecting portion and a second connecting end that are axially arranged in sequence in a forward direction. The first threaded connecting portion has a first external thread. Thereby, the sealing performance of the connection of the liquid tube and the liquid tube fitting is improved to prevent leakage.

10 Claims, 4 Drawing Sheets

(56) References Cited

U.S. PATENT DOCUMENTS

2017/0268705 A1* 9/2017 Jung .................... F16L 33/223

FOREIGN PATENT DOCUMENTS

| DE | 29622638 U1 * | 4/1997 | ............ F16L 33/223 |
| DE | 19841155 C1 * | 1/2000 | ............ F16L 33/225 |
| DE | 202011000061 U1 * | 6/2012 | ............ F16L 33/225 |
| EP | 0879982 A2 * | 11/1998 | ............ F16L 33/223 |
| EP | 1564473 A1 * | 8/2005 | .............. F16L 33/22 |
| FR | 3068105 B1 * | 8/2019 | ............ F16L 33/225 |
| WO | WO-2019150405 A1 * | 8/2019 | ............ F16L 19/065 |

* cited by examiner

LEAK-PROOF TUBE FITTING ASSEMBLY STRUCTURE

BACKGROUND OF THE INVENTION

1. Field of the Invention

The present invention relates to a tube fitting assembly structure, and more particularly to a leak-proof tube fitting assembly structure that is mainly applied to a liquid-cooling radiator, but not limited thereto.

2. Description of the Prior Art

A liquid-cooling radiator usually includes a cooling radiator and a liquid tube. The cooling radiator has a reservoir. The liquid tube is connected to the reservoir through a liquid tube fitting. The liquid tube and the liquid tube fitting are connected in a sleeve manner to achieve a sealing connection through the elastic deformation of the plastic of the liquid tube and the liquid tube fitting. Such a sealing structure has poor sealing performance and is prone to leakage. The liquid tube and the liquid tube fitting are easy to fall off. Later, a structure that uses a nut to lock the liquid tube and the liquid tube fitting is developed, which improves the leak-proof and anti-falling performance of the liquid tube and the liquid tube fitting. However, the leak-proof performance is still not ideal, and it has disadvantages such as complex components and troublesome assembly. It is not suitable for promotion and application.

SUMMARY OF THE INVENTION

In view of the defects of the prior art, the primary object of the present invention is to provide a leak-proof tube fitting assembly structure, which improves the sealing performance of the connection of a liquid tube and a liquid tube fitting to prevent leakage and ensures the stability of the connection of the liquid tube and the liquid tube fitting, without falling off.

In order to achieve the above objects, the present invention adopts the following technical solutions:

A leak-proof tube fitting assembly structure comprises a liquid tube, a liquid tube fitting, and a nut for locking and connecting the liquid tube and the liquid tube fitting.

The liquid tube fitting has a first connecting end, a first threaded connecting portion and a second connecting end that are axially arranged in sequence in a forward direction. The first threaded connecting portion has a first external thread. The first connecting end has an outer diameter less than that of the first threaded connecting portion.

An interior of the nut is provided with a first sealing member, a second sealing member and a first internal thread that are axially arranged in sequence in the forward direction.

One end of the liquid tube is sleeved on a periphery of the first connecting end. The nut is sleeved on a periphery of the liquid tube and screwed to the first threaded connecting portion. The first internal thread is mated with the first external thread. The first sealing member and the second sealing member are respectively deformed and sealed between an inner wall surface of the nut and an outer wall surface of the liquid tube by a locking and pressing action of the nut to prevent liquid leakage. The second sealing member and the first sealing member are located at front and rear ends of the first connecting end, respectively.

Compared with the prior art, the present invention has obvious advantages and beneficial effects. The nut is locked and connected to the liquid tube fitting in a threaded manner, and the nut tightens the first sealing member and the second sealing member to press one end of the liquid tube tightly. The liquid tube and the liquid tube fitting are in close connection with each other to form a double seal, thereby improving the sealing performance of the connection of the liquid tube and the liquid tube fitting, and no leakage occurs. The stability of the connection of the liquid tube and the liquid tube fitting is ensured, without falling off.

Secondly, the first sealing member and the second sealing member are attached with the nut. The operation is simple and convenient for assembly. The nut is directly rotated and locked. It is suitable for automation and mass production, and is beneficial for promotion and application. Besides, the arrangement of the first sealing member and the second sealing member takes into account the changes in the external dimension of the liquid tube after it is sleeved on the liquid tube fitting to ensure the sealing performance.

Furthermore, the liquid tube fitting may be threadedly connected to the reservoir to achieve a leak-proof assembly. It improves the sealing performance, achieves the purpose of preventing leakage, is easy to disassemble, simplifies the assembly process, reduces the difficulty of work, is conducive to the later disassembly and maintenance, and plays a role in dust prevention, thereby preventing dust from entering the interior of the reservoir.

The present invention has an ingenious and reasonable structure design, and is easy to produce. The first sealing member and the second sealing member are attached with the nut, and the third sealing member is attached with the liquid tube fitting. In this way, only the liquid tube, the liquid tube fitting, the nut and the reservoir need to be considered for assembly. It has the advantages of good leakage prevention, high assembly efficiency, and good assembly stability.

DETAILED DESCRIPTION OF THE PREFERRED EMBODIMENTS

Figure 1:
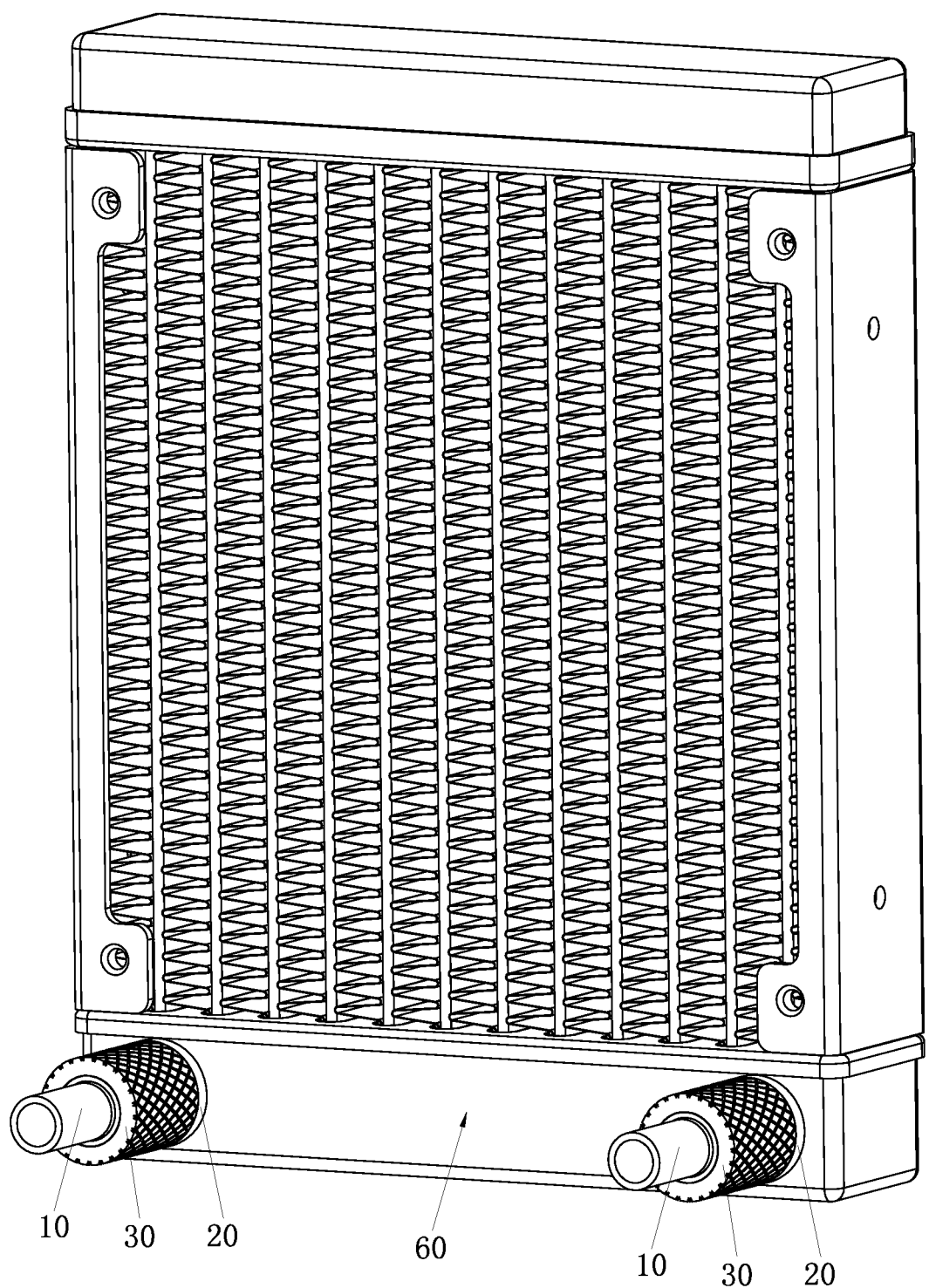
FIG. 1 is a perspective view according to a first embodiment of the present invention.
Figure 2:
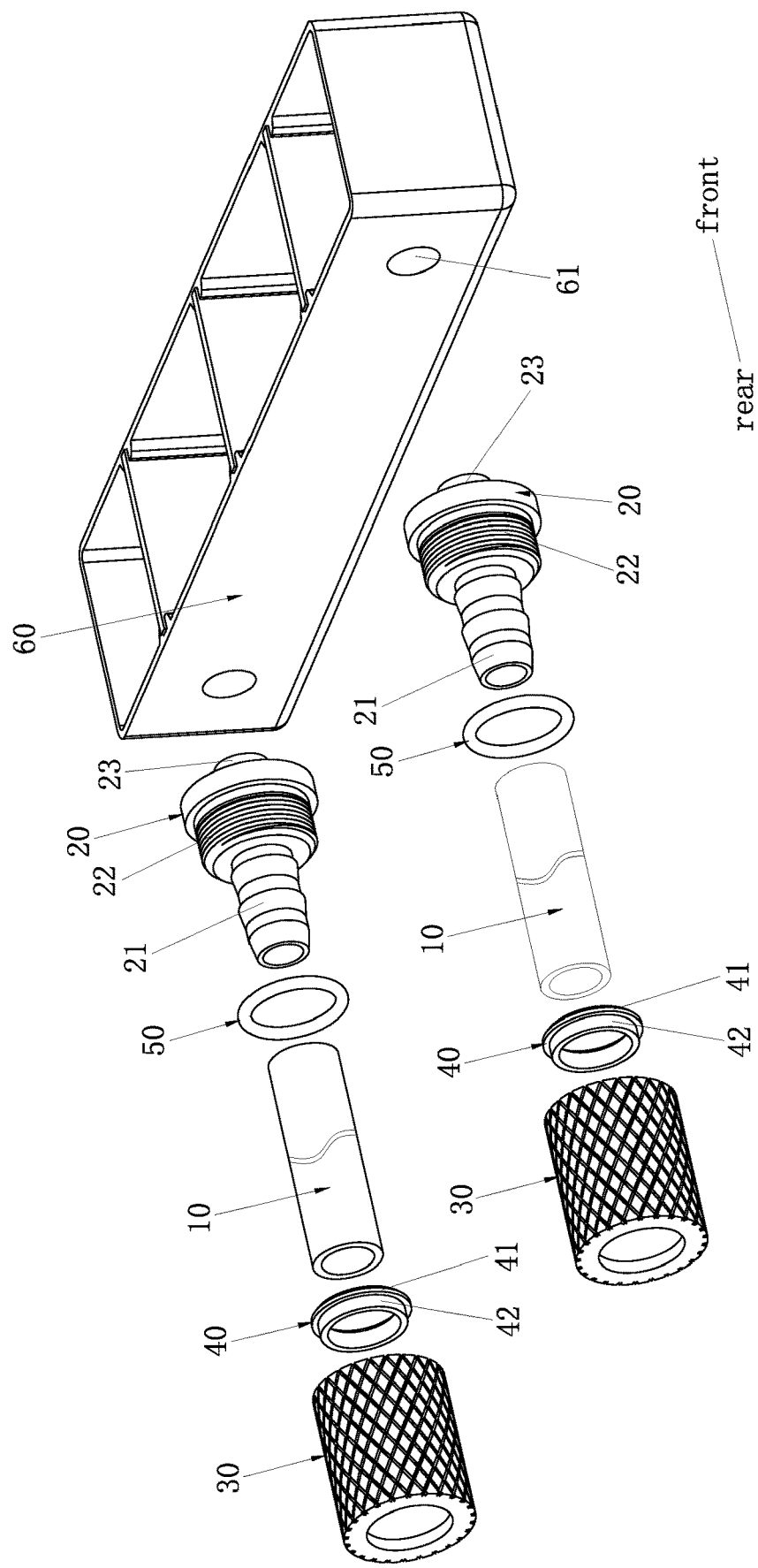
FIG. 2 is an exploded view according to the first embodiment of the present invention.

FIGS. 1 to 4 show the specific structures of two embodiments of the present invention.

A leak-proof tube fitting assembly structure comprises a liquid tube 10, a liquid tube fitting 20, and a nut 30 for locking and connecting the liquid tube 10 and the liquid tube fitting 20. The liquid tube fitting 20 has a first connecting end 21, a first threaded connecting portion 22 and a second connecting end 23 that are axially arranged in sequence in a forward direction. The first threaded connecting portion 22 has a first external thread. The outer diameter of the first connecting end 21 is less than the outer diameter of the first threaded connecting portion 22. The interior of the nut 30 is provided with a first sealing member 40, a pressing portion 33, a second sealing member 50 and a first internal thread that are axially arranged in sequence in the forward direction. One end of the liquid tube 10 is sleeved on the periphery of the first connecting end 21. The nut 30 is sleeved on the periphery of the liquid tube 10 and screwed to the first threaded connecting portion 22. The first internal thread is mated with the first external thread. The first sealing member 40 and the second sealing member 50 are respectively deformed and sealed between the inner wall surface of the nut 30 and the outer wall surface of the liquid tube 10 by the locking and pressing action of the nut 30 to prevent liquid leakage. The second sealing member 50 and the first sealing member 40 are located at the front and rear ends of the first connecting end 21, respectively. The pressing portion 33 is pressed against the outer wall surface of the liquid tube 10. The liquid tube 10 is a deformable/plastic liquid tube, such as a water tube.

The interior of the nut 30 is formed with a first positioning groove 31 and a second positioning groove 32 that are axially arranged in sequence in the forward direction and spaced apart from each other. The first sealing member 40 and the second sealing member 50 are respectively positioned in the first positioning groove 31 and the second positioning groove 32 and partially extend out of the pressing portion 33. The height h1 of the first sealing member 40 extending out of the pressing portion 33 is greater than the height h2 of the second sealing member 50 extending out of the pressing portion 33. The rear section of the first connecting end 21 is a lead-in configuration that is gradually enlarged in the forward direction. The maximum outer diameter R1 of the rear section of the first connecting end 21 is less than or equal to the maximum outer diameter R2 of the front section of the first connecting end 21, so that the portion of the liquid tube 10, sleeved on the rear section of the first connecting end 21, is expanded and deformed to be a gradually enlarged configuration.

The pressing portion 33 is located in front of the first positioning groove 31. The nut 30 has a positioning portion 34 behind the first positioning groove 31. The first sealing member 40 has a mounting rim 41 embedded in the first positioning groove 31 and an annular sealing ring 42 integrally connected to the mounting rim 41. The annular sealing ring 42 extends axially to cover the inner side of the positioning portion 34. The inner wall surface of the annular sealing ring 42 is in sealing contact with the outer wall surface of the liquid tube 10.

The front end of the second positioning groove 32 is in communication with the area enclosed by the first internal thread. The inner diameter of the second positioning groove 32 is equal to or greater than the maximum inner diameter of the first internal thread. The second sealing member 50 is a sealing ring. The second sealing member 50 is inserted from the front end of the nut 30 until it is confined by the inner rear end face of the second positioning groove 32. When the nut 30 is locked to the liquid tube fitting 20, the second sealing member 50 is in sealing contact with the inner rear end face of the second positioning groove 32 and the rear end face of the first threaded connecting portion 22 to form an axial seal.

The first positioning groove 31 and the second positioning groove 32 are an annular first positioning groove and an annular second positioning groove, respectively. The first sealing member 40 and the second sealing member 50 are a first sealing gasket and a second sealing gasket, respectively. The first sealing gasket and the second sealing gasket are positioned in the annular first positioning groove and the annular second positioning groove, respectively. Preferably, the first sealing member 40 and the second sealing member 50 are respectively a first silicone sealing gasket and a second silicone sealing gasket to achieve elastic deformation, thereby making the structure more compact.

The nut 30 is preferably a knurled nut 30.

Figure 3:
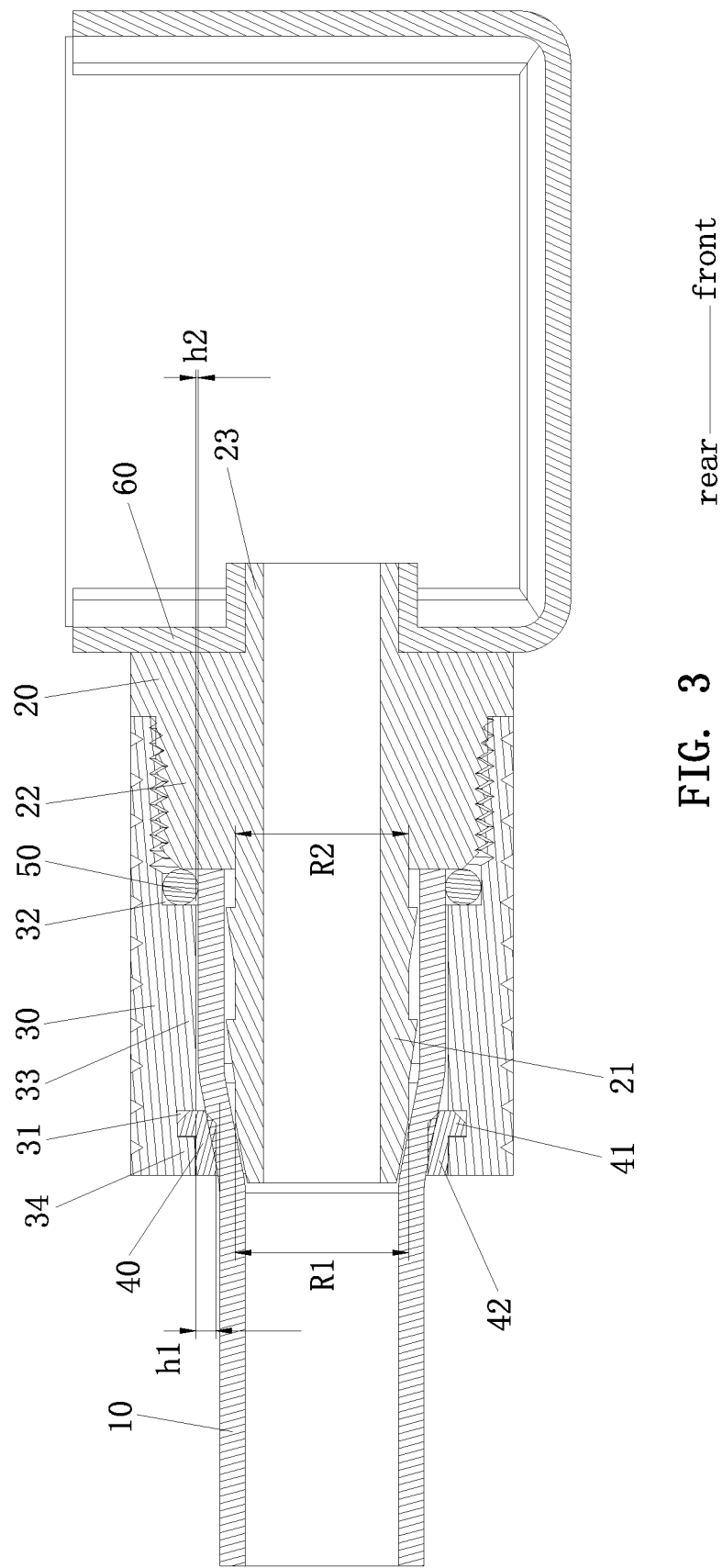
FIG. 3 is a cross-sectional view according to the first embodiment of the present invention.

The second connecting end 23 of the liquid tube fitting 20 is connected to a reservoir 60. As shown in FIG. 3, in the first embodiment, the second connecting end 23 of the liquid tube fitting 20 is fixed in a mounting hole 61 of the reservoir 60 by welding.

Figure 4:
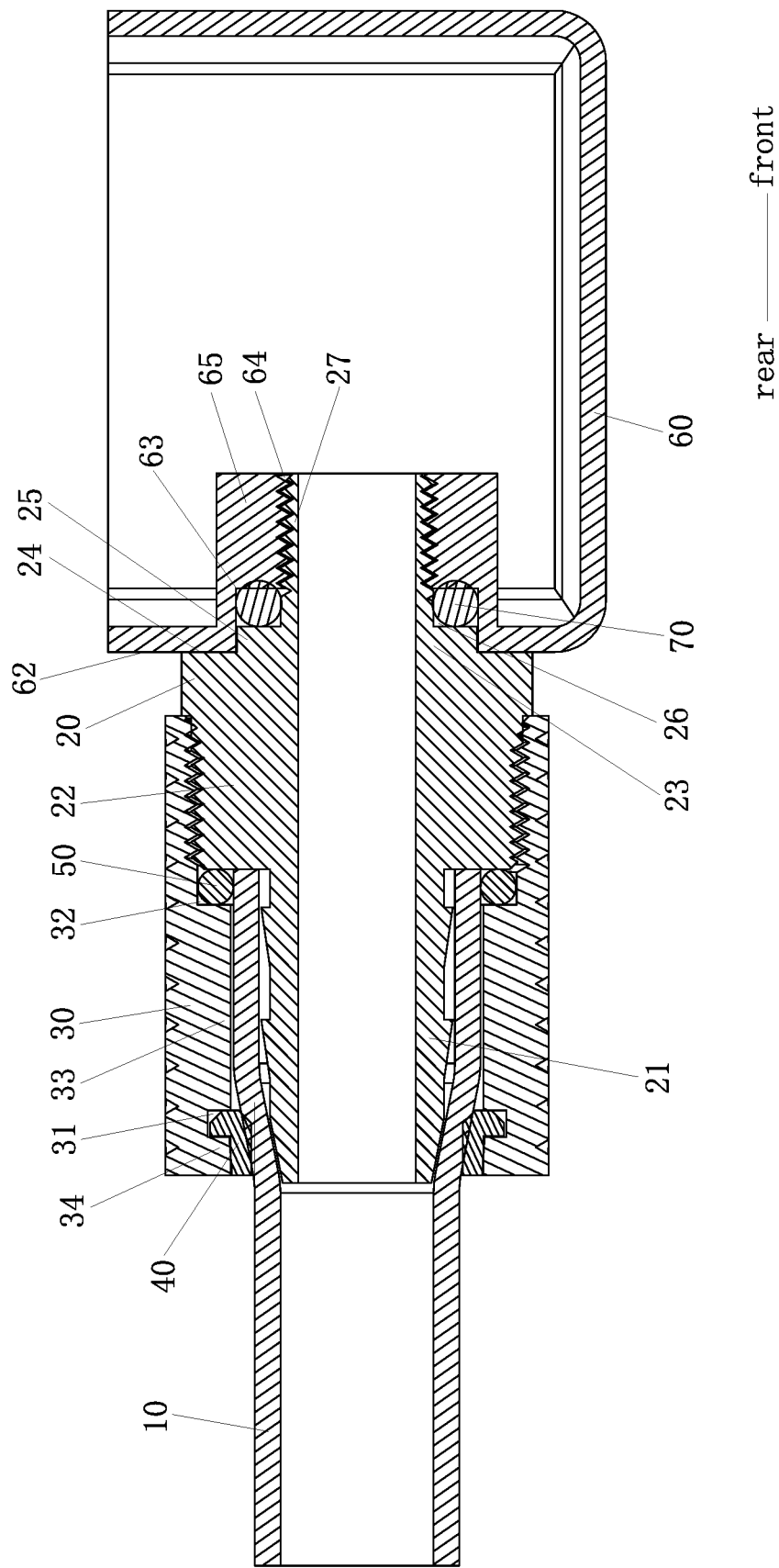
FIG. 4 is a cross-sectional view according to a second embodiment of the present invention.

As shown in FIG. 4, in the second embodiment, the second connecting end 23 of the liquid tube fitting 20 has a first dust-proof sealing face 24, an insert portion 25, a third positioning groove 26 and a second threaded connecting portion 27 that are axially arranged in sequence in the forward direction. The first dust-proof sealing face 24 is arranged corresponding to the periphery of the insert portion 25. The second threaded connecting portion 27 has a second external thread. The reservoir 60 has a mounting hole 61. The mounting hole 61 has a second dust-proof sealing face 62, a receiving hole portion 63 and an internal thread hole portion 64 that are axially arranged in sequence in the forward direction. The internal threaded hole portion 64 has a second internal thread. The inner diameter of the receiving hole portion 63 is greater than or equal to the maximum inner diameter of the internal thread hole portion 64. The receiving hole portion 63 and the internal thread hole portion 64 are in communication with the reservoir 60 in sequence. The second connecting end 23 is locked to the internal thread hole portion 64. The second external thread is mated with the second internal thread. The insert portion 25 is inserted into the receiving hole portion 63. A third sealing member 70 is provided between the second connecting end 23 and the mounting hole 61. The third sealing member 70 is in sealing contact with the front end face of the receiving hole portion 63 and the rear end face of the third positioning groove 26 to form an axial seal and prevent leakage. The first dust-proof sealing face 24 is attached to the outside of the second dust-proof sealing face 62.

The front end of the third positioning groove 26 is in communication with the area enclosed by the second external thread. The inner diameter of the third positioning groove 26 is equal to or greater than the maximum outer diameter of the second external thread. The third sealing member 70 is in sealing contact with the inner circumferential surface of the receiving hole portion 63 and the inner circumferential surface of the third positioning groove 26 to form a radial seal.

The reservoir 60 has a shaft portion 65 extending inwardly from the wall of the reservoir 60. The receiving hole portion 63 and the internal thread hole portion 64 of the mounting hole 61 are formed in the shaft portion 65. The second dust-proof sealing face 62 is arranged on the outer surface of the wall of the reservoir 60.

Preferably, the third sealing member 70 is a sealing ring. In particular, the sealing ring is preferably a silicone sealing ring, so that the deformation of the sealing ring can prevent liquid leakage when the liquid tube fitting 20 and the reservoir 60 are locked and connected. The sealing ring may be positioned in the receiving hole portion 63, or the sealing ring may be positioned in the third positioning groove 26.

What is claimed is:

1. A leak-proof tube fitting assembly structure, comprising a liquid tube, a liquid tube fitting, and a nut for locking and connecting the liquid tube and the liquid tube fitting;

the liquid tube fitting having a first connecting end, a first threaded connecting portion and a second connecting end that are axially arranged in sequence in a forward direction, the first threaded connecting portion having a first external thread, the first connecting end having an outer diameter less than that of the first threaded connecting portion;

an interior of the nut being provided with a first sealing member, a second sealing member and a first internal thread that are axially arranged in sequence in the forward direction;

one end of the liquid tube being sleeved on a periphery of the first connecting end, the nut being sleeved on a periphery of the liquid tube and screwed to the first threaded connecting portion, the first internal thread being mated with the first external thread, the first sealing member and the second sealing member being respectively deformed and sealed between an inner wall surface of the nut and an outer wall surface of the liquid tube by a locking and pressing action of the nut to prevent liquid leakage, the second sealing member and the first sealing member being located at front and rear ends of the first connecting end, respectively;

wherein the nut has a pressing portion that extends axially and is located between the first sealing member and the second sealing member, the interior of the nut is formed with a first positioning groove and a second positioning groove that are axially arranged in sequence in the forward direction and spaced apart from each other, the first sealing member and the second sealing member are respectively positioned in the first positioning groove and the second positioning groove and partially extend out of the pressing portion, and the pressing portion is pressed against the outer wall surface of the liquid tube.

2. The leak-proof tube fitting assembly structure as claimed in claim 1, wherein a height of the first sealing member extending out of the pressing portion is greater than a height of the second sealing member extending out of the pressing portion; a rear section of the first connecting end is a lead-in configuration that is gradually enlarged in the forward direction, a maximum outer diameter of the rear section of the first connecting end is less than or equal to a maximum outer diameter of a front section of the first connecting end, so that a portion of the liquid tube, sleeved on the rear section of the first connecting end, is expanded and deformed to be a gradually enlarged configuration.

3. The leak-proof tube fitting assembly structure as claimed in claim 2, wherein the pressing portion is located in front of the first positioning groove, the nut has a positioning portion behind the first positioning groove; the first sealing member has a mounting rim embedded in the first positioning groove and an annular sealing ring integrally connected to the mounting rim, the annular sealing ring extends axially to cover an inner side of the positioning portion; and an inner wall surface of the annular sealing ring is in sealing contact with the outer wall surface of the liquid tube.

4. The leak-proof tube fitting assembly structure as claimed in claim 2, wherein a front end of the second positioning groove is in communication with an area enclosed by the first internal thread, an inner diameter of the second positioning groove is equal to or greater than a maximum inner diameter of the first internal thread; the second sealing member is a sealing ring, the second sealing member is inserted from a front end of the nut until the second sealing member is confined by an inner rear end face of the second positioning groove; when the nut is locked to the liquid tube fitting, the second sealing member is in sealing contact with the inner rear end face of the second positioning groove and a rear end face of the first threaded connecting portion to form an axial seal.

5. The leak-proof tube fitting assembly structure as claimed in claim 1, wherein the second connecting end of the liquid tube fitting is connected to a reservoir.

6. The leak-proof tube fitting assembly structure as claimed in claim 5, wherein the second connecting end of the liquid tube fitting is fixed in a mounting hole of the reservoir by welding.

7. The leak-proof tube fitting assembly structure as claimed in claim 5, wherein the second connecting end of the liquid tube fitting has a first dust-proof sealing face, an insert portion, a third positioning groove and a second threaded connecting portion that are axially arranged in sequence in the forward direction;

the first dust-proof sealing face is arranged corresponding to a periphery of the insert portion, the second threaded connecting portion has a second external thread;

the mounting hole of the reservoir has a second dust-proof sealing face, a receiving hole portion and an internal thread hole portion that are axially arranged in sequence in the forward direction, the internal threaded hole portion has a second internal thread, an inner diameter of the receiving hole portion is greater than or equal to a maximum inner diameter of the internal thread hole portion; the receiving hole portion and the internal thread hole portion are in communication with the reservoir in sequence;

the second connecting end is locked to the internal thread hole portion, the second external thread is mated with the second internal thread, the insert portion is inserted into the receiving hole portion, a third sealing member is provided between the second connecting end and the mounting hole, the third sealing member is in sealing contact with a front end face of the receiving hole and a rear end face of the third positioning groove to form an axial seal and prevent leakage, and the first dust-proof sealing face is attached to an outside of the second dust-proof sealing face.

8. The leak-proof tube fitting assembly structure as claimed in claim 7, wherein a front end of the third positioning groove is in communication with an area enclosed by the second external thread, an inner diameter of the third positioning groove is equal to or greater than a maximum outer diameter of the second external thread; and the third sealing member is in sealing contact with an inner circumferential surface of the receiving hole portion and an inner circumferential surface of the third positioning groove to form a radial seal.

9. The leak-proof tube fitting assembly structure as claimed in claim 8, wherein the reservoir has a shaft portion extending inwardly from a wall of the reservoir, the receiving hole portion and the internal thread hole portion of the mounting hole are formed in the shaft portion, and the second dust-proof sealing face is arranged on an outer surface of the wall of the reservoir.

10. The leak-proof tube fitting assembly structure as claimed in claim 7, wherein the reservoir has a shaft portion extending inwardly from a wall of the reservoir, the receiving hole portion and the internal thread hole portion of the mounting hole are formed in the shaft portion, and the second dust-proof sealing face is arranged on an outer surface of the wall of the reservoir.

* * * * *